United States Patent [19]
Zaccheo

[11] 3,777,413
[45] Dec. 11, 1973

[54] PERSONAL SENSITIVITY TEST METHOD AND APPARATUS THEREFOR

[76] Inventor: John T. Zaccheo, Glenview, Ill. 60025

[22] Filed: July 10, 1972

[21] Appl. No.: 270,000

[52] U.S. Cl. .................................. 35/22 R, 273/1 R
[51] Int. Cl. ............................................ G09b 19/00
[58] Field of Search ........................ 35/22 R, 69, 26; 273/1 R, 94 R

[56] References Cited
UNITED STATES PATENTS

| | | | |
|---|---|---|---|
| 2,587,242 | 2/1952 | Stringer | 273/94 R |
| 2,974,426 | 3/1961 | McDonald | 35/26 |
| 3,124,358 | 3/1964 | Weedman | 35/22 R X |

*Primary Examiner*—Wm. H. Grieb
*Attorney*—Watson D. Harbaugh et al.

[57] ABSTRACT

A method for the systematic investigation of mental phenomena and skills associated with consciousness, behavior, emotions, traits and reactions to stimuli is disclosed which includes the steps of conveying one or more word messages by oral or visual means, associating the message with an identifying indicia and comparing the matches and mismatches of indicia as an indication of the sensitivity or lack thereof to the mental stimuli. The apparatus used to conduct the testing, which can be a serious psychiatric analysis and psychological investigation or a humorous and fascinating parlor game participated in by two or more individuals, comprises, in one embodiment, a set of cards having a plurality of sets of word phrase stimuli thereon with the stimuli of any one set being divided into three or more classes of conservative, moderate and aggressive connotations or meanings. The sets of cards are divided into several categories of human expression relating the senses, time, acts, words, mood, etc. The stimuli on each set of cards are coded in accordance with their class or contrary to the class of other sets so that no preceptive pattern can be established from use in repeated tests or plays and auxillary means are provided to record the results, score the players and arrive at a final measure of the personal sensitivity, compatibility, analytic skills, psychological reactions, superficial traits and outward manifestations of behavior of one or more participants.

24 Claims, 10 Drawing Figures

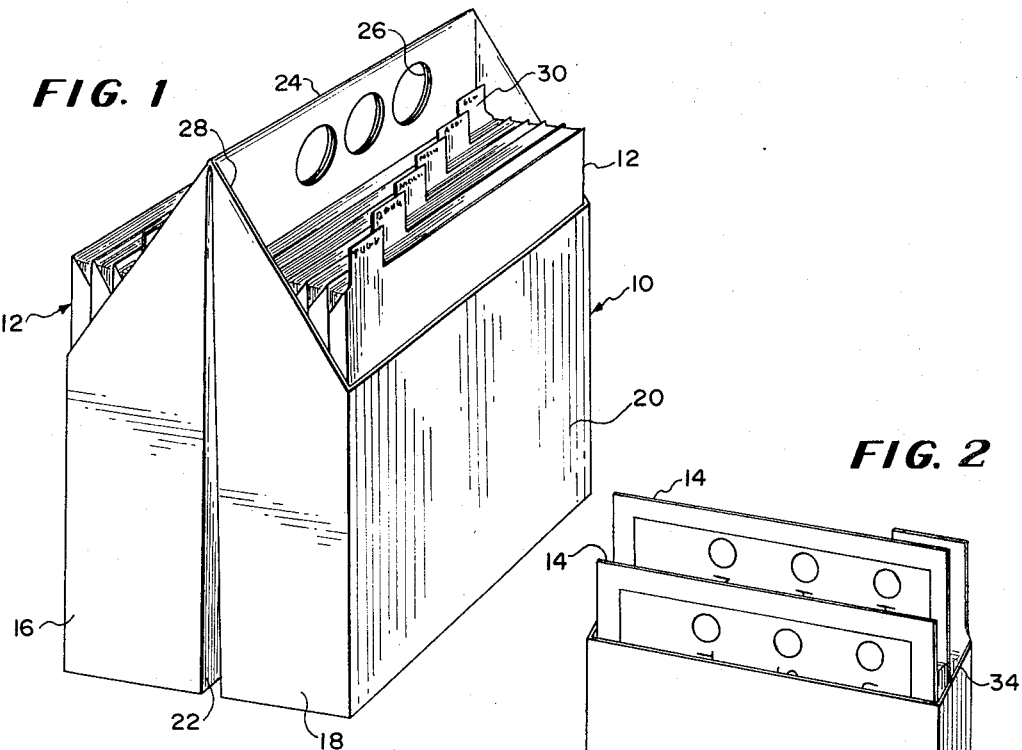
FIG. 1
FIG. 2
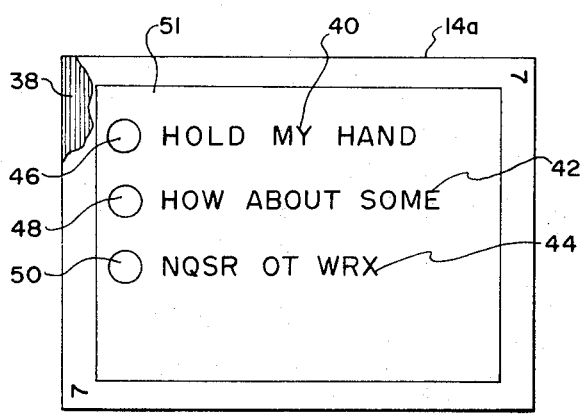
○ HOLD MY HAND
○ HOW ABOUT SOME
○ NQSR OT WRX
FIG. 3
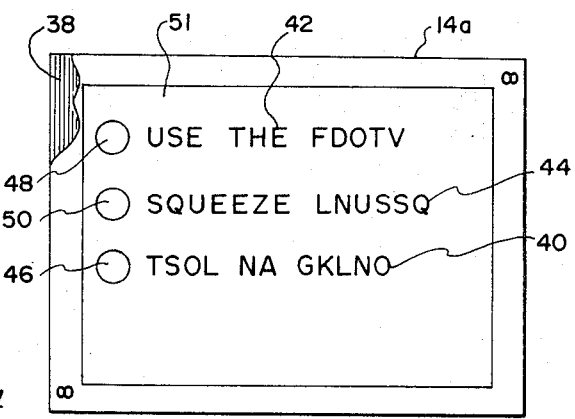
○ USE THE FDOTV
○ SQUEEZE LNUSSQ
○ TSOL NA GKLNO
FIG. 4

PATENTED DEC 11 1973　　3,777,413

PERSONAL SENSITIVITY TEST METHOD AND APPARATUS THEREFOR

BACKGROUND OF THE INVENTION

Aside from the wall known multiple choice form of questioning in which one answer is more correct either factually or psychologically to the intended result than the rest and a scattering of card games designed among other things to test one's ability to build sentences or words, or educational devices wherein authors, painters or heroes are associated with their works or events in history; the prior art is devoid of a system of testing or analyzing the emotional reactions of one person to gradations of stimuli and analytical skills with or without numerical grading or scoring system. The prior art does not disclose a method whereby the personal sensitivity of one party to himself or to another can be evaluated or the compatibility of one person to a situation can be measured or the conscious behavior, attraction or lack thereof can be exposed.

Generally in psychiatric examinations the reactions of an individual to stimuli in the form of questions or suggestions are related to finding that incident, experience or impression which most influenced or changed the mental phenomena of the person which has resulted in the present personality. The test procedure includes a probing of the memory more than a recording of reactions to everyday stimuli and as a result of the examination depends not only on the responsiveness of the individuals concerned but also upon the skill of the interrogator. A particular psychiatrist may be successful with one patient and unsuccessful with another, while a second psychiatrist may have the opposite results, even though both followed the standard approach to psychiatric examination. In either event, the art does not evaluate how close or how far away from a meaningful probe of mental phenomena the unsuccessful examinations were, or how much more meaningful, in a shorter period of time, the successful probe might have been.

SUMMARY OF THE INVENTION

The testing or amusement method of this invention overcomes the inadequacies of the prior art by providing a flexible systematized investigative procedure for mental and intellectual phenemona whereby the stimuli is conveyed, identified and compared in a manner which is closely keyed to the measure of personal sensitivity, compatibility, analytical skills, or psychological reactions desired of one or more participants. A feature of the invention is the adaptability to singular or plural participation. Also the coding of the stimuli and their sequence of presentation is subject to variation so that the individual cannot detect a pattern of identifying indicia among the mental stimuli by which to slant or direct his or her reactions away from their real being or personality.

These advantages or unusual results are attained through several embodiments of the invention which can be used in part or totally by either the amateur or the professional for either amusement or serious psychological analysis. The final measure of personal sensitivity, compatibility or human behavior is recordable either as a personal record, a fun result as in a game or as a serious psychological analysis depending on the categories and classes of stimuli used. The invention includes the card structures, their consignment to categories, the manner of conducting the investigation or play using same, the subsidiary indicia for matching or mismatching the choices and means for recording and displaying the results, if desired.

DESCRIPTION OF THE DRAWINGS

Several embodiments of the physical means associated with and usable in conducting the investigation of this invention are illustrated in the drawings wherein:

FIG. 1 is an isometric view of one form of a dual card pocket used in the method of this invention;

FIG. 2 is an isometric view of an individual folder from the packet of FIG. 1 with a number of the cards partially raised into view;

FIG. 3 is a plan view of one of the cards from the folder of FIG. 2;

FIG. 4 is a plan view of the reverse side of the same card shown in FIG. 3;

DESCRIPTION OF THE PREFERRED EMBODIMENTS

Figure 5:
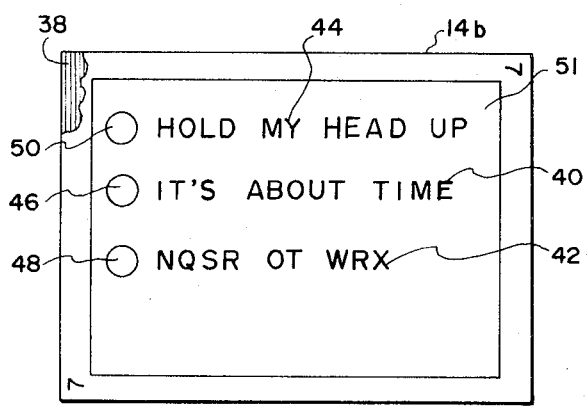
FIG. 5 is a plan view of one of the cards from another folder taken from the packet of FIG. 1.

The invention will first be described briefly in relation to example parts or structures that can be used in connection therewith along with variations of these parts. In FIG. 1 there is shown a dual card packet 10 which forms a convenient carrying case for the individual folders 12 which hold any desired number of cards or pages 14 used for the purpose of conveying one or more messages orally or visually. The packet 10 comprises a pair of box-like receptacles 16 and 18 which have planar side members 20 and a back wall member 22 which is hinged to the other along the top edge as as 24. The opposing top edges, just below the hinge 24 are provided with matching finger holes 26 which register therethrough and provide access for the hand in carrying the packet.

Each of the receptacles 16 and 18 is open at the top and the intervening top edge 28 of the end wall is cut at an angle so as to expose the folders 12 for easy removal. Each folder 12 is provided with an identifying tab 30 upon which is entered a generic term indicating the general categories of human expression relating to such terms as time, acts, words, touch, etc. Furthermore, if desired the folders 12 can be themselves color or design coded upon their side walls as indicated at 32 which illustrates only a portion of the surface thereof for simplicity of illustration. Each of the receptacles 16 and 18 may contain the same number of such color-coded folders 12, with one folder in each receptacle bearing the same code definition on its exterior. For example, there can be six folders in each receptacle each color-coded red, green, yellow, blue, brown and white. The number of such folders can vary and in one aspect of the investigative method of this invention a pair of each color is used, one in one receptacle and one in the other.

The folders 12 also have angle-cut top edges 34 on their end walls 36. The receptacles 16 and 18 and folders 12 are fabricated of any light-weight sheet material such as cardboard or plastic.

An arbitrary number of cards 14 is carried or bound in each folder 12 depending on the means adapted for selection of a particular card for the given moment of investigation or play. This number of cards is variable depending on the depth of probe desired into the mental phenomenon of the participants, the manner or means used for their selection, and, whether or not both sides of the cards are used for purposes of use. If the card selection is made by chance, using either a single die, a pair of dice or a numbered wheel with a spinner, then the number of sides of the cards used will correspond to the numbers one to 12 or the number of indicated divisions of the numbered wheel. When both sides of the cards are used, for convenience, the first card will be identified on side one with the number 1 and the back side of the same card can be identified as number 2.

This is illustrated in FIGS. 3 and 4 wherein the fourth card 14a from one of the folders bears the number 7 on one side and the number 8 on the other side. These numbers are placed at any convenient place on the card, preferebly at the border and near a corner for easy references as indicated.

All of the cards in any one folder are color-coded or otherwise identified on their surface or border, as indicated at 38 in FIGS. 3 and 4. Thus, the cards from each folder are identified with that folder so that they do not become mixed with cards from other folders.

The face or faces of the cards bear at least two and preferably three or more mental stimuli indicated at 40, 42 and 44 which can take the form of the word phrases illustrated, as in the case of a parlor game or psychiatric investigation or may be drawings, pictures, or any indicia which imparts a mental impression.

Located adjacent to and identifying each of the mental stimuli on the one side of the card, is a numerical, alphabetical or color-coded symbol 46 for stimulus 40, the symbol 48 for stimulus 42, and the symbol 50 for stimulus 44. These symbols can be of colors contrasting from that of the card itself for best visibility. Each may represent a particular degree, depth or connotation of the probe illustrated by the message of its associated stimulus. Thus, all of the symbols 46 in the series of cards throughout the several folders in both packets 16 and 18 can indicate a conservative approach or degree of expression; all of the symbols 48 can represent a moderate approach or degree of expression, while the symbols 50 can represent an aggressive or radical approach or message. This method of identifying the degrees of probe can be uniform throughout the cards or mixed up as desired in any combination. Thus, if the symbol 46 on the side 7 of the card 14a in FIG. 3 is color-coded blue, it can represent a conservative message, the symbol 48 can be green to represent a moderate message and the symbol 50 can be red to represent an aggressive message.

Likewise the symbols 46, 48 and 50 on the reverse side of the card 14a shown in FIG. 4 can be the same as the above, namely blue, green and red, respectively, but assigned different orders of appearance on the card so that there is no particular significance to the relative position of the messages. The messages or stimuli 40, 42 and 44 on side 8 of card 14a (FIG. 4) are not the same as the messages 40, 42 and 44 on side 7 of the same card shown in FIG. 3.

The symbols 46, 48 and 50 can be made removable or subject to arbitrary change or switching in positions so that their significance is not only altered but no set pattern can be established by any participant. For this purpose the symbols can be circular colored discs having a pressure sensitive adhesive on the back side thereof. A supply of such discs can form a part of the device.

The card 14a, shown in FIG. 5, shows a card 7 taken from another folder of the same color code on the other side of the packet 10 and illustrates that the order of appearance of the symbols 46, 48 and 50 is changed as well as the messages 40, 42 and 44 thereon, although both the cards 7 of FIGS. 3 and 5 are from the same category. The areas 51 on each of the cards are preferably a lighter color such as white so that the stimuli printed thereon will be in contrast.

The embodiments of FIGS. 1 to 5 comprise one form of means whereby stimuli of various categories of mental phenomenon are conveyed since once a card has been selected and the message chosen it can be relayed by any number of means to test the reaction of the individual under test or investigation, as will be more fully explained. As one embodiment of the method the tester, psychiatrist or challenger will have a card 7 from one folder under a selected category before him and the other participant will view the same card 7 assuming that the number 7 was the arbitrary or chance selection for the cards 14. The probe is made by the replaying of the message from the card by the challenger to the second and the reply or response is made by the counter-reply of the second party from the same card.

Alternatively as another embodiment, the challenger may use a card 7 from an envelope under a given category from one side of the packet 10 while the opposer uses a card 7 from an envelope under the same category from the other side of the packet. The scoring is the same, but the possibility of mis-match is increased or decreased as desired in accordance with the messages and sensitivities of the parties.

Figure 6:
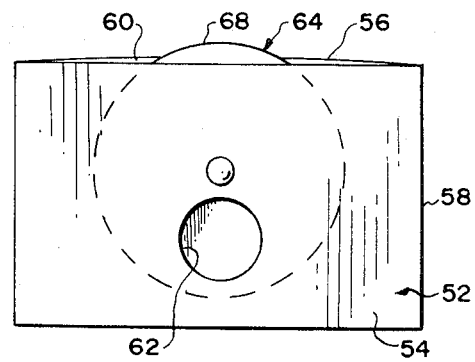
FIG. 6 is a plan view of a choice indicator that is used in one aspect of the invention.
Figure 7:
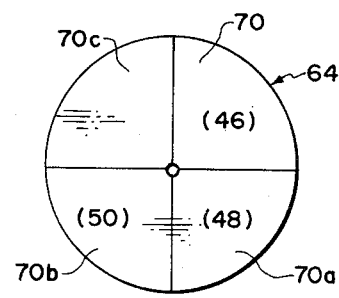
FIG. 7 is a plan view of the rotatable disc from the choice indicator of FIG. 6.

FIGS. 6 and 7 illustrate a means for keying the selected symbol of a given message or stimuli by one party to the other. The device shown in FIG. 6 comprises cardboard or plastic envelope 52 having the front and back sides 54 and 56 which are sealed or joined along the edges 58 on three sides and open at the top 60. The front side 54 has the aperture 62 therein, while the back side 56 is continuous. The disc 64 (see FIG. 7) is located practically fully within or between the front and back sides 54 and 56 of the envelope and is rotatably mounted upon the axis 66 which can extend through each side. The top edge 68 of the disc 64 extends from the opening 60 sufficiently so that it can be engaged by a fingertip and rotated as the envelope is held by the edges or one corner so as not to bind same. The disc 64 is divided into two or more segments 70 which are color-coded or bear indicia conforming with the symbols 46, 48 and 50 on the cards 14. Thus the segment 70 can bear the indicia 46, the segment 70a can bear the symbol 48 and the segment 70b can bear the symbol 50. These numerals are shown on the respective segments in parentheses for purposes of illustration. The segment 70c can be a four category, be meaningless or register a totally non-responsive attitude. Only one of the message keying means illustrated in FIG. 6 and 7 is required normally, although one can be provided for each participant and more than one pair of players can engage in the game at one time.

In order to record the selection of a message chosen from a card 14, the one party, making the first choice as tester or challenger, merely turns the disc 64 so that the particular segment 70 or 70a which bears the same symbol as the message on the card is exposed in the opening 62. In one embodiment after each party has made his selection and properly rotated the disc 64 to expose the symbol corresponding to his choice of message, the selections are compared and they will either match or be mismatched. Thus, a comparison of one party's message to the other and the response can be made of record or for purposes of scoring, as desired.

Figure 8:
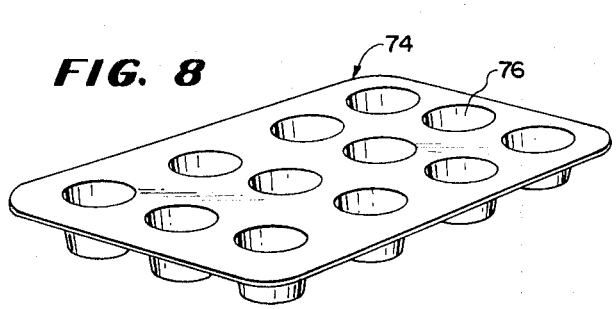
FIG. 8 is an isometric view of one form of recorder that is used in one aspect of the invention.

FIGS. 8 amd 9 illustrate a form of scoring or test evaluation that can be used, although any number of different scoring methods may be used.

In FIG. 8 a pan 74 having a plurality of indentations or cups 74 spaced thereon is shown. The pan 74 can be made of tin or plastic. A biscuit pan can be used for this purpose.

Figure 9:
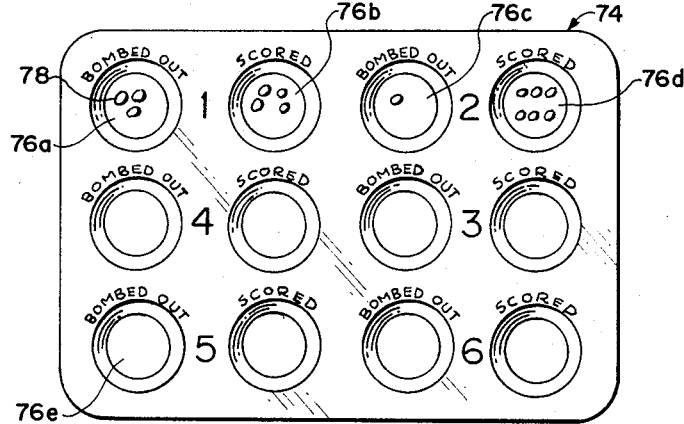
FIG. 9 is an enlarged plan view of the recorder shown in FIG. 8 with scoring means thereon.
Figure 10:
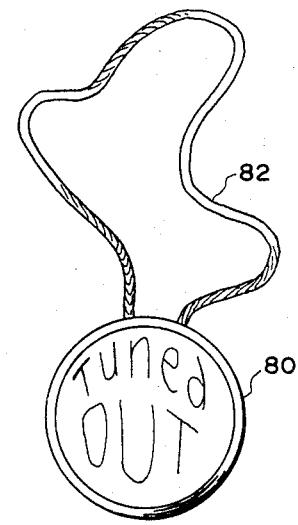
FIG. 10 is a plan view of a button to be worn by a loser at the end of a round of the game.

FIG. 9 shown how the pan 74 is numbered 1, 2, 3, etc. to identify the participants or players. For player No. 1 there is provided the pair of cups 76a and 76b, while player No. 2 uses the cups 76c and 76d. The balance of the numbers are located between the pairs of cups to be used by these particular players. Over the cups 76a and 76c and those additional cups, i.e., 76e, there is provided the identifying message "BOMBED OUT," while the other cup for each player bears the identification "SCORED." The marbles or beans 78, as illustrative counting means, are placed in the appropriate cup as the player matches or mis-matches with his opponent. a counting means 78 is placed in the "BOMBED OUT" cup for mis-match and in the "SCORED" cup for a match. Other counters can be used.

In scoring, the difference is taken between the total counters in one cup from those in the other. There being three counters in the "BOMBED OUT" cup of player No. 1 and four counters in the "SCORED" cup, that player's score would be the difference, or 1 "SCORED." If player No. 2 were his opponent he will have the same total number of counters used but their distribution in the cups will vary. This his seven counters may be distributed with one in the "BOMBED OUT" cup and six in the "SCORED" cup, as illustrated, so the end result or score is 6 "SCORED." Player No. 2 wins the round or is more sensitive to player No. 1 than that player is to him.

This entitles player No. 1 to wear a means to identify his or her sensitivity such as the button 80 having the string or cord 82 attached thereto and bearing the message "TUNED OUT" or "DAME DUMB" around his neck. His opponent or the winner will wear a button like 80, but bearing the message "TUNED IN' or "BROAD BRIGHT."

From the foregoing description it is seen that the invention can be used to develop personal skills in the area of human experience and awareness, in relationships between participants, as for example, between females and males, student and teacher, employer and employee, etc. The invention can best be utilized in a manner whereby "clues" from the cards are given orally by the participants. Clues so presented between females and males increase their sensitivity to each other so that they begin to recognize the emotional needs of each other as the method or game progresses. The invention can be used to develop skills of observation and verbal interpretation which can be used to enforce intellectual, physical and affectionate needs of a hetero-sexual relationship.

The invention can be applied as a game played by one or more couples. For example, the challenger declares that she or he can determine in what way the other party of opposite gender will express his or her emotional needs. The challenger can declare his approach from six categories represented by the tabs 30: time, dress, mood, acts, touch and words, as previously explained. There are twelve cards 14 with three phrases 40, 42 and 44 on each card in each category making a total of thirty-six clues. Once the category is chosen the challenger then rolls the dice or spins a wheel or points to a number from one to twelve. This number determines the card 14 from the envelope 12 which he must use to pick the phrase in that category that best describes the other party's expression in that category.

The challenger reviews the three phrases on the card which are properly marked for identification (46, 48 or 50) and places the card aside or on an easel, without exposure to the other party. Each player has a marking disc 52 which has the same identifications (46, 48 or 50) thereon. The challenger determines which phrase is the most indicative of the other party and dials the disc to the identifying phrase. The other party reviews the card and determines which phrase best described his or her expression and dials the identifying phrase on his disc. If they match when simultaneously exposed and viewed, they have scored; if not, they have not scored, or in the vernacular "bombed out."

If the choices are not the same, there is no match and the challenger has "bombed out" and he or she is either on the way to being "Dame Dumb" or "Tuned Out." On the other hand, if there is a match, he or she is either "Broad Bright" or "Tuned In!" If "bombed out," he places a bean or counter in the "Bombed Out" jar in front of him; if he matches, he or she puts a bean in the scored jar. The process goes to the next matched players, and so on.

The game is played for as many rounds as desired, but for a meaningful score it must have a minimum of about five rounds.

The scoring may be kept on a crad, which subtracts the "Bombed Out" counters or beans from the "Scored" counters or beans and a tally made.

Scoring may be as follows:

Five rounds or more.

Beans in scored jar after tally. The cue sense and index of the participants are determined from a master scoring card as set forth in the following table by way of illustration.

|  | Cue Sense |  | Index |
| --- | --- | --- | --- |
| 8 to 10 beans | Women | Tuned In | High Sex Appeal |
| 8 to 10 Beans | Men | Broad Bright | High Sex Appeal |
| 6 to 7 beans | Women | On the Beam | Needs Practice |
| 6 to 7 beans | Men | Shows Promise | Needs Practice |
| 4 to 5 beans | Women | Holding Your Own | Time for a New Dress |
| 4 to 5 beans | Men | Holding Your Own | Time for Renewal |
| 2 to 3 beans | Women | Dull! | Turning Point Ahead |
| 2 to 3 beans | Men | Lost! | Put the make On |
| 0 to 1 bean | Women | Tuned Out | Get Hold of Yourself |
| 0 to 1 bean | Men | Dame Dumb | Talk to a Friend |

Those participants scoring from eight to 10 points or beans as determined from the above master scoring card, wear, for the women, a "Tuned In" button, and for the men, a "Broad Bright" button. The losers are those in the zero to one point or bean count — they wear a "Tuned Out" or "Dame Dumb" button until a new game is completely played and a new winner is chosen and the buttons exchanged by the ultimate winners or losers.

The Teen-Age Word Phrase Match Game

This is the same style as the prior game, but with different phrases 40, 42 and 44, and scoring.

In this game the equipment is the same, only the players try to guess what reaction the other player would have under different stimuli, i.e., there is an invitation to a slumber party. Then the participants spin the discs 64 under the category situation, and now the number lists three phrases and the other party, along with the disc roller, picks a phrase that fits him or her, and a match is made. For boys under situations there would be such subjects as "A Girl Invites You to Dance." In the series, the choice is now made and a match is determined, etc.

Scoring is as follows:

Five rounds or more.

Beans in Scored jar after tally. The cue sense and index are determined from a master scoring card as follows:

|  |  | Cue Sense | Index |
|---|---|---|---|
| 8 to 10 Beans | Girls | Mature | Full Date Book |
| 8 to 10 Beans | Boys | Right On | Busy, Busy |
| 6 to 7 Beans | Girls | On the Beam | Doing Her Homework |
| 6 to 7 Beans | Boys | Shows Promise | Rapping Well |
| 4 to 5 Beans | Girls | Holding Your Own | Ask Some Questions |
| 4 to 5 Beans | Boys | Holding Your Own | Needs Experience |
| 2 to 3 Beans | Girls | Dull! | Get With It |
| 2 to 3 Beans | Boys | Lost! | Pay Attention |
| 0 to 1 Bean | Girls | Guy Goon | Get Hold of Yourself |
| 0 to 1 Bean | Boys | Chick Chump | Talk to a Friend |

As an illustrative embodiment the game means consists of a series of 36 cards 14 which can measure about 10 × 5 inches, with three phrases on each side of the card. With six cards in each envelope 12 a series of 36 phrases in each category is available for play. The cards 14 in one embodiment have six basic categories of expression or experience for each female and each male. The cards are preferably uniformly colored, for each category, with a white printing surface to highlight the phrases for visibility. The colors can be, for example; red, yellow, blue, brown, green and gray. The female cards can be in pastels and the male cards can be in the solid, basic colors.

Each card identifies a phrase by a blue, green and red dot. The cards are sized i.e., 5 × 10 inches to allow their insertion into the box of convenient size i.e., 12 × 10 × 3 inches. The cards are held in a sleeve or envelope 12 for each category so as to be readily selected. The sleeve is designed in such a way that when the cards are inserted or the envelope or cover folded and they are in the box, each tab 30 is offset so that the category of Time, Dress, Mood, Acts, Touch and Words can be easily identified. The phrases 44 on each of the cards are common, normally acceptable, social phrases which are easily identified on experience and survey The other portions of the game or method include the signal device 64, dice or a spin wheel, and an easel (not illustrated) which latter is dismantable. The game package also includes the four buttons of 2 inches diameter made of baked enamel with a cord attached and to be worn around the neck of the appropriate player. The game buttons can have the following phrases permanently on the face of the button: one with "Tuned In" and one with "Tuned Out" all written in psychedelic colors for female participants, one with "Broad Bright" and one with "Dame Dumb" also written in psycedelic colors for male participants. The box 10 is so designed that it can be easily transported and conveniently handled by the participants. There may also be a scoring pad included which indicates the cue sense and also compatibility of the players depending on the degree of skills they have developed. For serious testing the packet 10 of FIG. 1 alone can be used without the buttons, etc. Although cards are disclosed herein as the means for displaying the visual stimuli, any convenient method for displaying at least two and preferably three or more such stimuli, in the form of word messages, pictures, abstract drawings, etc. can be used, particularly in carrying out the method. The cards can be formed in a circle and the selection made by a radial arm that turns thereover with means to pin-point the particular stimuli selected, like a slide rule. The stimuli can be hinged for displayed through a slide projector, or as scenes from a movie. The cards can be connected on to the other like a tape and rolled sequentially past an aperture for viewing.

The invention can be used for psychiatric testing, student teacher counseling, salesman training, as a practice war or diplomatic skills game, as an international appeal monitor, and as a teenage match word game or party game. In one aspect of the game or method the intent is to draw out introspectiveness in a person, i.e., his ability to see within himself. A particular stimulus means different things to different people and this invention allows an examiner, be he professional or amateur to being out the best or worst in a person, for fun or for serious psychological or psychiatric purposes. Consequently the categories of subject matter for the stimuli can be adjusted to these specific types of examination. Examples of other categories are work habits, study habits, driving a car, household duties, executive duties, the selection of clothing, purchasing groceries, how one feels about one's spouse, death, birth, seeing a movie, television commercials, market analyses, consumer habits and how one feels about borrowing money. The stimuli on any set of cards can apply to more than one category of human expression or endeavor.

In applying the method of this invention to the measurement of diplomatic compatibility of an individual as an international appeal monitor, the objective would be to determine the areas of personal traits which are diplomatically cohesive and those which are diplomatically repelling. The stimuli can be politically, geographically or economically oriented or comprise a mixture of these categories of expression. Any stimuli can be factual, fanciful or a complete falsehood and so coded. The stimuli on any one card can fall into these three degrees of expression. Likewise a salesman training course can be outlined on the cards 14 and the sales acumen of an individual or group determined.

I claim:

1. A personal sensitivity test apparatus comprising:
   a first set of a plurality of cards bearing at least two separate visual stimuli on a side thereof;

a code designation identifying each of said visual stimuli;

a second set of a plurality of cards bearing at least two separate visual stimuli on a side thereof;

an identical code designation identifying each of said visual stimuli on said second set of cards in coordination with the visual stimuli on said first set of cards;

the visual stimuli on said first and second sets of cards relating to the same category of human expression;

means to selectively identify and display the code designation of any one stimulus by the independent participants whereby the selected codes of the participants are compared; and means to record the successive times the selected code designation of one participant matches with the selected code designation of the other participant as a measure of the personal sensitivity between the participants for that category of human expression.

2. A personal sensitivity test apparatus in accordance with claim 1 in which, said visual stimuli on each of said cards of both said first and second sets comprise word phrases.

3. A personal sensitivity test apparatus in accordance with claim 1 in which, said visual stimuli comprise pictures.

4. A personal sensitivity test apparatus in accordance with claim 1 in which, said visual stimuli comprise symbols.

5. A personal sensitivity test apparatus in accordance with claim 1 in which, said code designations comprise colored areas.

6. A personal sensitivity test apparatus in accordance with claim 1 in which, said code designations comprise numbers.

7. A personal sensitivity test apparatus in accordance with claim 1 in which, said code designations comprise letters of the alphabet.

8. A personal sensitivity test apparatus in accordance with claim 1 in which, the order of appearance of said visual stimuli on said cards is sequential and each stimulus represents a different degree of suggestion as to that category of human expression, and the sequence of appearance of said stimuli from card to card on any one set differs from the corresponding card of the other set as well as the code designations therefor.

9. A personal sensitivity test apparatus in accordance with claim 1 in which, each card of the first set has a companion card in the second set, means are provided to identify said companion cards, and means are provided to arbitrarily select the pairs of companion cards from the respective sets for use by each participant.

10. A personal sensitivity test apparatus in accordance with claim 1 in which, an open-ended envelope is provided for each set of said cards.

11. A personal sensitivity test apparatus in accordance with claim 10 in which several sets of said cards are provided and each is contained in an open-ended envelope.

12. A personal sensitivity test apparatus in accordance with claim 11 in which, a dual compartment packet is provided to contain the several sets of said open-ended envelopes in succession therein for ready selection.

13. A personal sensitivity test apparatus in accordance with claim 12 in which said dual compartments are open at their tops and hinged together along the inside top walls of each compartment.

14. A personal sensitivity test apparatus in accordance with claim 1 including, means to identify the participants in accordance with his or her personal sensitivity to the other.

15. A personal sensitivity test apparatus in accordance with claim 14 in which, said identifying means comprises a button.

16. A personal sensitivity test procedure comprising:

the selection of a visual stimulus from at least two separate stimuli relating to a category of human expression by a first party;

each of said stimuli being coded to represent different degrees of personal sensitivity thereto by said first party;

the selection of a visual stimulus from at least two separate stimuli relating to the same category of human expression by a second party;

each of said stimuli being coded to represent different degrees of personal sensitivity thereto by said second party;

repeating the said selections by said parties from additional stimuli relating to said category;

comparing the similarities and dissimilarities in said selections, and recording the number of times the said coded selections of stimuli match and mismatch as a measure of the personal sensitivity between said parties.

17. The test procedure in accordance with claim 16 in which, the selection of said visual stimuli by said parties is through the sequential and independent examination of the stimuli, followed by simultaneous comparison of said selections so that during the selection by one party the other party is unaware of the selection until his respective selection is made.

18. The test procedure of claim 16 conducted as:

a parlor game wherein counters are employed to score the matching and mis-matching of stimuli; and those participants who score the most matching stimuli and the least matching stimuli are determined from a master scoring sheet indicating by ranges of points scored the magnitude of sensitivity between the parties.

19. A personal sensitivity test apparatus comprising:

a first set of a plurality of pages each of which bears a plurality of separate visual stimuli on a side thereof;

said stimuli relating to a category of human expression;

a code designation opposite and identifying each of said visual stimuli;

a second set of a plurality of pages each of which bears a plurality of separate visual stimuli on a side thereof;

said stimuli on said second set of pages relating to the same category of human expression as said first set;

an identical code designation opposite and identifying each of said visual stimuli on said second set of pages in coordination with the visual stimuli on said first set of pages;

the number of said visual stimuli and identifying codes on each of said sets of pages for any category being the same;

means to selectively identify and display the code designation of any one stimulus by independent participants whereby the selected codes of the participants are compared in sequence; and means to record the successive times the selected code designation of one participant matches with the selected code designation of the other participant as a measure of the personal sensitivity between the participants for that category of human expression.

20. A psychiatric examination method comprising:

the selection of a visual stimulus from at least two separate stimuli relating to a category of human expression by a first party;

each of said stimuli being coded to represent different psychiatric responses thereto by said first party;

the said selection representing that coded response to said stimulus which best represents the expected behavior of a second party thereto;

the selection of a visual stimulus from at least two separate coded stimuli relating to the same category of human expression by said second party;

the said selection representing that coded response to said stimulus which best represents the self-acknowledged behavior of said second party thereto;

repeating said selections by said first and second parties from additional stimuli relating to said category;

comparing the selections of coded stimuli made by said parties;

recording the number of said selections by the first party which coincide with the selections of said second party;

recording the number of said selections by said first party which so not coincide with the selections of said second party;

and determining the differences in said numbers as a measure of the psychiatric response between the parties.

21. A psychiatric examination method in accordance with claim 20 in which:

the selection of visual stimuli is made by the first party from separate printed messages having at least three different shades of meaning; and the selection of visual stimuli is made by the second party from the same printed messages in sequence thereafter.

22. A psychiatric examination method in accordance with claim 20 in which:

the selection of visual stimuli is made by the first party from a different set of separated printed messages having at least three shades of meaning, from that used by the second party;

said printed messages for both parties are coded by adjacent indica;

and the selection of the printed messages by both parties is recorded and simultaneously exchanged through means for each participant to display the code selected.

23. A parlor game procedure comprising the steps of:

selecting a pair of individuals from a group;

designating one of the individuals as the challenger;

providing a set of cards each bearing visual stimuli having at least three gradations of meaning in a selected category of human expression;

one of said individuals arbitrarily selecting a number from 1 to 12, said numbers corresponding to the sides of cards bearing said visual stimuli thereon in gradations of meaning;

one of said individuals viewing the selected card and choosing one of the gradations of meaning best defining that individual's personal sensitivity to the other individual;

said other individual viewing the selected card and choosing one of the gradations of meaning best defining that individual's personal sensitivity to the first individual;

said cards bearing indicia of said gradations of meaning; and said individuals making their respective choices through identity of said indicia whereby the proportion of matched indicia to mis-matched indicia is a measure of personal compatibility between said individuals in that category.

24. A parlor game in accordance with claim 23 in which said individuals each choose a card bearing the selected number from first and second sets of said cards, said sets having different visual stimuli thereon.

* * * * *